United States Patent Office 3,284,949
Patented Nov. 15, 1966

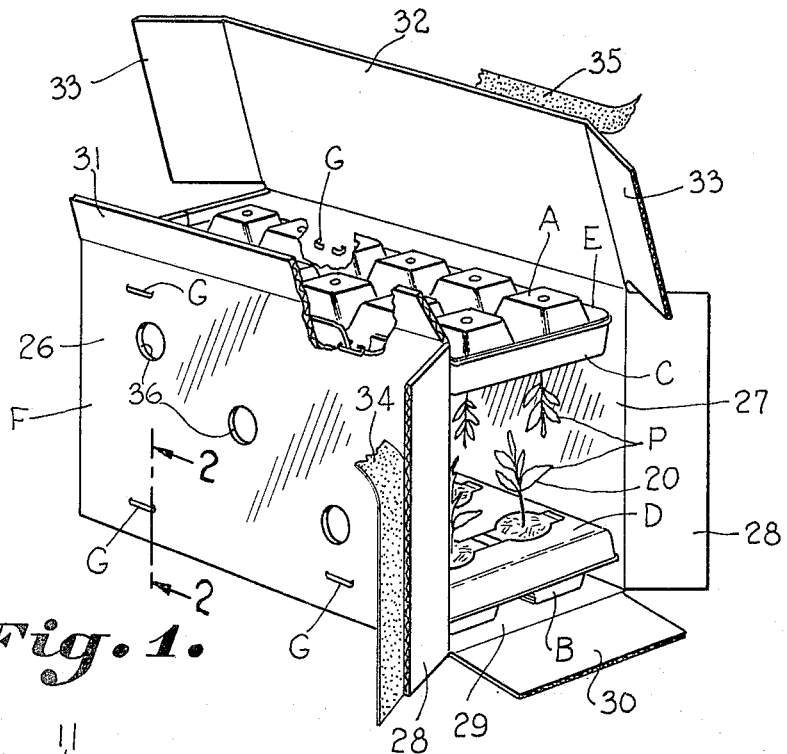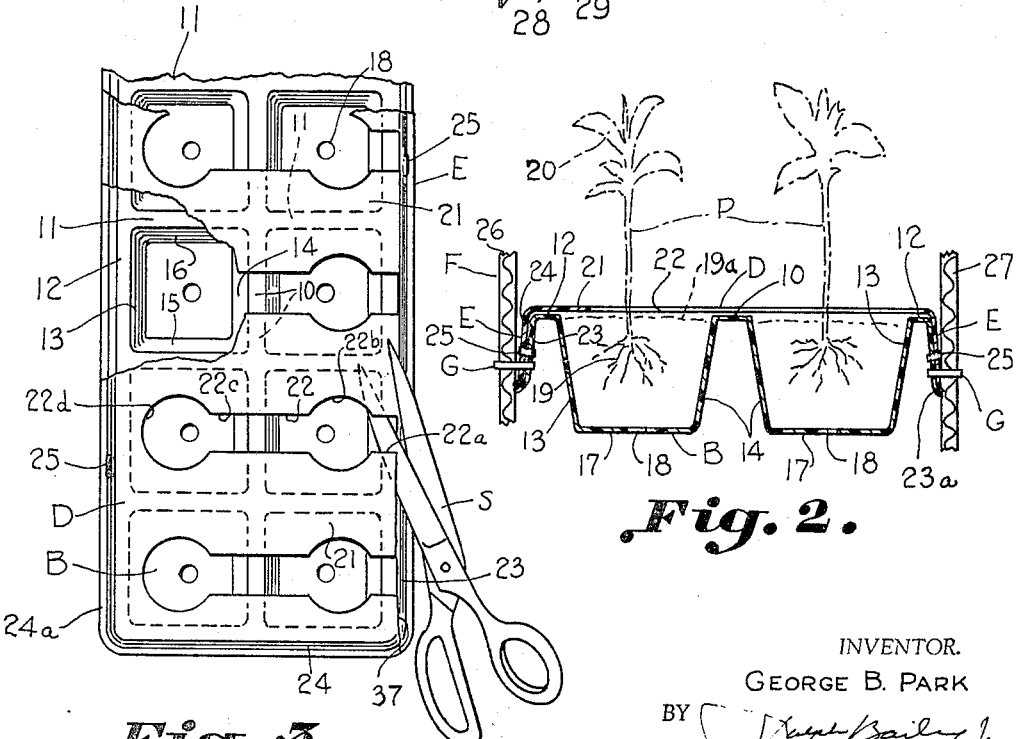

3,284,949
PLANT SHIPPING CONTAINER
George B. Park, Cokesbury Road, Greenwood, S.C.
Filed July 13, 1964, Ser. No. 382,097
4 Claims. (Cl. 47—34.11)

This invention relates to a container for shipping growing plants, seedlings and the like.

Heretofore, shipping containers for plants have assumed a variety of relatively makeshift forms. Little effort has been made to conserve space so as to ship the maximum number of plants in a given size package, thus requiring relatively large amounts of postage. While the plant growers have tried to protect growing plants as much as possible during shipment, former containers have failed to provide adequate protection for the growing plants during the relatively rough handling received during shipment.

Accordingly, it is an important object of this invention to provide a sturdy inexpensive container which will afford adequate protection for growing plants during shipment.

Another important object of the invention is to provide a shipping container for growing plants which not only conserves space, but provides adequate means for retaining moisture for the plants.

Another very important object of the invention is to provide a container for shipping growing plants in which the plants are afforded adequate protection during shipment and which is easily packed and unpacked without damage to the plants.

Still another object of the invention is to provide a growing container for the plants which may later be used as a shipping container thus avoiding the necessity for removing the plants from a growing container preparatory to shipment.

The construction designed to carry out the invention will be hereinafter described, together with other features thereof.

The invention will be more readily understood from a reading of the following specification and by reference to the accompanying drawing forming a part thereof, wherein an example of the invention is shown and wherein:

FIGURE 1 is a perspective view, with parts broken away, illustrating a shipping container for growing plants constructed in accordance with the present invention, FIGURE 2 is an enlarged transverse sectional elevation taken on the line 2—2 in FIGURE 1, and FIGURE 3 is a plan view at a slightly reduced scale as compared to FIGURE 2 illustrating a mode of unpacking a container constructed in accordance with the present invention.

The drawing illustrates a shipping container for growing plants, seedlings and the like. A pair of trays A and B, having a plurality of spaced open compartments therein for accommodating a suitable medium, are provided for carrying the root system of the plants P. A pair of covers C and D, one for each tray, each has a plurality of spaced openings therein allowing the remainder of the plant to project therethrough, but positively positioning each plant within its compartment. Each of said trays and each of said covers has overlapping marginal portions on each side of each tray and each cover, as illustrated at E, thus forming individual tray assemblies. A cardboard container F has a pair of spaced vertical walls on both sides of said assemblies. Means G fasten the assemblies to the walls on each side of each assembly. The assemblies are vertically spaced with the upper tray inverted so that the plants projecting from each tray extend toward each other.

The trays A and B are identical and each includes a substantially horizontal portion 10 extending longitudinally in the central portion of the tray. A plurality of spaced transverse horizontal portions 11, together with marginal horizontal portion 12 form an upper surface for each of the trays A and B. Rows of compartments are formed by downwardly and inwardly extending sides 13 and 14 projecting from the marginal portions 12 and the central horizontal portion 10, respectively. Complementary side portions 15 and 16 extend downwardly and inwardly from the laterally extending portions 11. Each of the compartments has a bottom 17 having an annular opening 18 for excess moisture to drain therefrom when packing the trays.

It has been found that plants may best be grown within the compartments, in unmilled sphagnum moss although, other suitable mediums such as peat moss may be used. Thus, the root systems are not restricted on transplanting such as is the case with the usual "peat pots." The medium 19a, serves to contain the root systems 19 of the plants P and provide moisture therefor during shipment. The root systems may be easily removed from the downwardly and inwardly tapering compartments. The leafy portion 20 forming the remainder of the plant extends toward the middle portion of the container.

A pair of covers C and D, which are identical to each other, are provided for the trays A and B, respectively. Each of the covers includes a substantially horizontal rectangular portion 21 having longitudinally spaced openings 22 therein. The openings 22 commence with a slot portion 22a adjacent one edge of the cover joined to an open portion 22b above one of the compartments. The opening 22b opens into a slot 22c which is in turn joined to an open portion 22d above the next adjacent compartment.

The marginal portions E each include a downwardly and somewhat outwardly extending marginal flange 23 and 24. The marginal portions 24 of the covers are joined to the marginal portions 23 of the trays as by staples 25 spaced therealong. Downwardly and outwardly extending projections 23a and 24a are carried by the marginal flanges 23 and 24, respectively. The trays and covers are preferably constructed of thin, flexible, resilient plastic. The cardboard container F has a pair of vertical walls 26 and 27 for receiving the tray, cover assemblies therebetween. The marginal portions E are preferably pressed inwardly to substantially vertical position (FIGURE 2) by the walls which are positioned relatively closely together. Thus, a tight resilient fit is provided for the assemblies by the walls 26 and 27, so that the assemblies may be positioned and held for placement of the staples G.

A pair of end flaps 28 are provided adjacent each end of the walls. A bottom 29 carries an end flap 30 adjacent each end thereof. The top of the cardboard container includes flap portions 31 and 32. The flap 32 overlies the flap 31 and carries flaps 33 adjacent each end thereof. The end flaps are joined on each end portion by pressure sensitive adhesive strips 34 or by staples if desired. Pressure sensitive adhesive strips 35 or any other suitable fastening means, such as staples and the like, join the top flap portions 31 and 32. It will be noted that the sides 26 and 27 each include spaced openings 36 therein to provide breathing holes for the container.

For unpacking the container the staples, which attach the marginal portions E to the cardboard container, are removed. Then a pair of scissors, illustrated at S in FIGURE 3, separates the upper surface 21 of the covers from the marginal portions 23 thereof by cutting as at 37. The staples 25 are removed on the side of the cover remote from the slot 22a, so that the cover may be slid off of the top of the tray leaving the plants P free for easy removal and without damage thereto.

While a preferred embodiment of the invention has been described using specific terms, such description is for

What is claimed is:

1. A shipping container for growing plants, seedlings and the like including, a tray having a plurality of spaced open compartments therein for accommodating a suitable medium for carrying the root system of the plants, a cover for said tray having a plurality of spaced openings therein for allowing the remainder of the plant to project therethrough, but positively positioning each plant within the tray, said tray and said cover having overlapping marginal portions on each side of the tray and cover, a container constructed of cardboard and the like having a pair of spaced walls on each side of said tray and said cover, means fastening said tray and said cover together forming a tray cover assembly and fastening said assembly to the walls on each side of the assembly, said tray and said cover being constructed from thin flexible resilient material, and said openings for the remainder of said plant extend to one side of the assembly, whereby the cover may be cut along one side opening the side of said openings for bending the cover toward the other side to unpack the tray.

2. A shipping container as set forth in claim 1, further including a second tray having a plurality of spaced open compartments therein for accommodating a suitable medium for carrying the root system of the plants, a second cover for said second tray having a plurality of spaced openings therein for allowing the remainder of the plant to project therethrough, but positively positioning each plant within the second tray, said second tray and said second cover having overlapping marginal portions on each side of the tray and cover, and means fastening said second tray and said second cover together forming a second tray cover assembly and fastening said second assembly to the walls of said container, said assemblies being vertically spaced.

3. The shipping container as set forth in claim 2 wherein the upper tray of said vertically spaced assemblies is inverted, whereby the remainder of the plants projecting from both trays extend toward the central portion of the container.

4. A shipping container for growing plants, seedlings and the like including, an open tray for accommodating a suitable medium for carrying the root system of the plants, a cover for said tray having a plurality of spaced openings therein for allowing the remainder of the plant to project therethrough, but positively positioning each plant within the tray, said tray and said cover having overlapping marginal portions on each side of the tray and cover, a container constructed of cardboard and the like having a pair of spaced walls on each side of said tray and said cover, means fastening said tray and said cover together forming a tray cover assembly, means positioning said assembly against relative movement within the walls of the container to avoid injury to said growing plants, said tray and said cover being constructed from thin flexible resilient material, and said openings for the remainder of said plant extend to one side of the assembly, whereby the cover may be cut along one side opening the side of said openings for bending the cover toward the other side to unpack the tray.

References Cited by the Examiner

UNITED STATES PATENTS

| 963,133 | 8/1910 | Cooper | 229—27 |
| 1,669,617 | 5/1928 | Kennedy | 47—34.11 |
| 2,238,818 | 4/1941 | Mulford et al. | 47—34.11 |
| 3,028,705 | 4/1962 | Howard | 47—34.13 |

ABRAHAM G. STONE, *Primary Examiner.*

ANTONIO F. GUIDA, *Examiner.*

J. R. OAKS, *Assistant Examiner.*